United States Patent
Matsumoto et al.

(10) Patent No.: US 7,557,871 B2
(45) Date of Patent: Jul. 7, 2009

(54) PATTERNING PHASE DIFFERENCE PLATE, PRODUCTION METHOD FOR PATTERNING PHASE DIFFERENCE PLATE, 2D/3D SWITCHING TYPE LIQUID CRYSTAL DISPLAY PANEL, AND 2D/3D SWITCHING TYPE LIQUID CRYSTAL DISPLAY UNIT

(75) Inventors: Toshihiro Matsumoto, Nara (JP); Akihiko Kojima, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 422 days.

(21) Appl. No.: 10/529,233

(22) PCT Filed: May 28, 2003

(86) PCT No.: PCT/JP03/06712

§ 371 (c)(1),
(2), (4) Date: Mar. 25, 2005

(87) PCT Pub. No.: WO2004/029700

PCT Pub. Date: Apr. 8, 2004

(65) Prior Publication Data

US 2006/0164578 A1    Jul. 27, 2006

(30) Foreign Application Priority Data

Sep. 26, 2002    (JP) ............... 2002-280573
Sep. 26, 2002    (JP) ............... 2002-280593

(51) Int. Cl.
*G02F 1/1335*    (2006.01)
(52) U.S. Cl. ..................... 349/15; 349/117

(58) Field of Classification Search ............. 349/117, 349/72, 73, 84, 96, 95, 112, 64, 15, 57, 74, 349/22, 86; 353/7; 359/462
See application file for complete search history.

(56) References Cited

U.S. PATENT DOCUMENTS

| 6,046,849 A | 4/2000 | Moseley et al. |
| 6,055,013 A | 4/2000 | Woodgate et al. |

(Continued)

FOREIGN PATENT DOCUMENTS

EP    0860728 A1    8/1998

(Continued)

OTHER PUBLICATIONS

International Search Report mailed Aug. 26, 2003.

*Primary Examiner*—Thoi V Duong
(74) *Attorney, Agent, or Firm*—Nixon & Vanderhye P.C.

(57) ABSTRACT

First rubbing is performed on an entire surface of an alignment film (22) provided on a substrate (21), and then a mask part (51a) for masking a first region and a region of an alignment mark is formed on the alignment film (22) by using a resist layer (51). After performing second rubbing on the alignment film (22) through the mask part (51a), the mask part (51a) is removed, and a liquid crystal layer (23) is formed on the alignment film (22). In this way, the alignment mark is formed as a region having an optical function different from an optical function of a region surrounding the alignment mark.

Thus, it is possible to produce a substrate (21) having an alignment mark formed without increasing processing steps at such a position as to contact the liquid crystal layer (23).

4 Claims, 9 Drawing Sheets

U.S. PATENT DOCUMENTS

2004/0012851 A1  1/2004  Sato et al.

FOREIGN PATENT DOCUMENTS

| | | |
|---|---|---|
| JP | 01-92721 A | 4/1989 |
| JP | 8-101367 | 4/1996 |
| JP | 2000-227606 A1 | 8/2000 |
| JP | 2001-142071 | 5/2001 |
| JP | 2002-40426 | 2/2002 |
| JP | 2003-75773 | 3/2003 |

LIGHT-RECEIVING SECTION

LIGHT SOURCE

■ CUTOFF REGION
☐ TRANSMISSION REGION
▨ IMAGE FOR RIGHT EYE
▨ IMAGE FOR LEFT EYE

PATTERNING PHASE DIFFERENCE PLATE, PRODUCTION METHOD FOR PATTERNING PHASE DIFFERENCE PLATE, 2D/3D SWITCHING TYPE LIQUID CRYSTAL DISPLAY PANEL, AND 2D/3D SWITCHING TYPE LIQUID CRYSTAL DISPLAY UNIT

This application is the U.S. National Phase of international application PCT/JP03/06712 filed May 28, 2003, which designated the U.S. and claims priority of JP 2002-280573 filed Sep. 26, 2002 and JP 2002-280593 filed Sep. 26, 2002, the entire contents of each of which are hereby incorporated by reference.

TECHNICAL FIELD

The present invention relates to a patterning phase difference plate (for use in a 2D/3D switching type liquid crystal display panel and the like) having an alignment mark, a production method for the patterning phase difference plate, a 2D/3D switching type liquid crystal display panel capable of switching between 2D display and 3D display, and a liquid crystal display unit.

BACKGROUND ART

In the production process for a liquid crystal display panel and the like, two substrates for sandwiching a liquid crystal layer are produced separately, and then bonded with each other. Usually, an alignment mark is formed on each of the substrates, and the alignment mark is used for alignment in the process of bonding the substrates.

Conventionally, the alignment mark is formed by providing an exclusive-use film (which is exclusively for forming the alignment film) provided on an entire surface of the substrate under an alignment film, and patterning the exclusive-use film. Thus, formation of the alignment mark increases processing steps.

In order to form the alignment mark without increasing the processing steps, resist for forming a wiring pattern is used as the alignment mark in Japanese Publication for Unexamined Patent Application, Tokukaihei 1-92721 (publication date: Apr. 12, 1989).

According to a liquid crystal display unit in Japanese Publication for Unexamined Patent Application, Tokukaihei 1-92721 (publication date: Apr. 12, 1989), a mask part and an alignment mark part (a part to be used as the alignment mark) are formed simultaneously by using a resist layer (which functions as a mask in patterning an ITO (Indium Tin Oxide) film (wire) by development). After the wiring pattern is formed by development, only the mask part of the resist layer is removed, and the alignment mark is left. The alignment mark is used later for alignment.

Meanwhile, in a 2D/3D switching type liquid crystal display panel proposed recently (see, for example, U.S. Pat. No. 6,046,849 (Date of patent: Apr. 4, 2000)), a patterning phase difference plate is used as a parallax barrier. The phase difference plate includes an alignment film and a liquid crystal layer (which are provided on a substrate), and has different optical characteristics from region to region.

In producing the 2D/3D switching type liquid crystal display panel, it is necessary to align the patterning phase difference plate with a liquid crystal panel for generating a display image, and to bond the patterning phase difference plate and the liquid crystal panel. Therefore, there is a need for a method that does not increase the processing steps even if the alignment mark of the patterning phase difference plate is formed.

However, according to the arrangement of Japanese Publication for Unexamined Patent Application, Tokukaihei 1-92721 (publication date: Apr. 12, 1989), the resist layer, which is also used for forming the wiring pattern, is also used for forming the alignment mark. Therefore, if the alignment mark is formed in a region where the liquid crystal layer is to be formed, the alignment mark remains as an inner surface of a cell (into which liquid crystal is to be injected) even after the substrates are bonded. As a result, the alignment mark directly contacts liquid crystal injected into the cell.

By nature, the resist used as the alignment mark is not highly resistant to solvent medium. Therefore, if the alignment mark is formed in such a position that the alignment mark directly contacts the liquid crystal, the resist is deformed by dissolving into the liquid crystal solution. This causes a problem that alignment cannot be performed at high accuracy.

If the alignment mark formation method in Japanese Publication for Unexamined Patent Application, Tokukaihei 1-92721 (publication date: Apr. 12, 1989) is applied to a substrate for use in a liquid crystal panel, the foregoing problem can be solved by forming the alignment mark in a region other than the liquid crystal layer. However, the alignment mark formation method in Japanese Publication for Unexamined Patent Application, Tokukaihei 1-92721 (publication date: Apr. 12, 1989) cannot be applied to the patterning phase difference plate in U.S. Pat. No. 6,046,849 (Date of patent: Apr. 4, 2000), because the liquid crystal layer is formed on an entire surface of the substrate.

A person with an ordinary viewing field perceives images from two different points of view, because two eyes of the person are spatially separated from each other at the head. A human brain recognizes a 3D object from a parallax of the two images. By utilizing this mechanism, a liquid crystal display unit that performs 3D (three-dimensional) display has been developed. The 3D display is realized by causing a viewer to see an image from two different points of view (the right eye and the left eye) so as to generate a parallax.

In a liquid crystal display unit which performs 3D display, an image for the left eye and an image for the right eye to be displayed on a display screen are encoded according to e.g. color, polarization state, or display time, so as to supply images for different points of view to viewer's eyes. Then, the images are separated through an eye-glasses-type filtering system covering the viewer's eyes. In this way, the image for the left eye is supplied to the left eye only, and the image for the right eye is supplied to the right eye only.

In another liquid crystal display unit, a display panel 101 is combined with a parallax barrier 101 having a light-transmitting region and a light-shielding region arranged in a stripe shape. This allows a viewer to recognize a 3D image without using a visual assistance tool such as the filtering system (automatic 3D display). To an image for the right eye and an image for the left eye, which are generated by the display panel 101, the parallax barrier 102 gives certain angles (see FIG. 9(a)). From certain viewing regions in the space, the viewer can recognize a 3D image because the right eye can see only the image for the right eye, and the left eye can see only the image for the left eye (see FIG. 9(b)).

A liquid crystal display unit that performs automatic 3D display by thus using the parallax barrier is disclosed in U.S. Pat. No. 6,055,013 (Date of patent: Apr. 25, 2000), for example. In U.S. Pat. No. 6,055,013 (Date of patent: Apr. 25, 2000), a patterning phase difference plate is used as the parallax barrier.

A liquid crystal display unit disclosed in e.g. U.S. Pat. No. 6,046,849 (Date of patent: Apr. 4, 2000) includes the parallax barrier, and the liquid crystal display unit can electrically switch between 3D display and 2D display (two-dimensional display) because the liquid crystal display unit includes a switching liquid crystal layer or the like as a means of switching between a state where an effect of the parallax barrier is enabled and a state where the effect of the parallax barrier is disabled. That is, in accordance with ON/OFF of the switching liquid crystal layer, the unit of U.S. Pat. No. 6,046,849 (Date of patent: Apr. 4, 2000) performs 3D display when the effect of the parallax barrier is enabled, and performs 2D display when the effect of the parallax barrier is disabled.

However, this arrangement of the conventional 2D/3D switching type liquid crystal display unit has the following problem.

When the 2D/3D switching type liquid crystal display unit performs 3D display, light emitted from a light source passes through three active areas, i.e. the switching liquid crystal layer, the parallax barrier, and a display liquid crystal layer (a liquid crystal layer for generating a display screen). Therefore, the 2D/3D switching type liquid crystal display unit is realized by a transmissive liquid crystal display unit.

When the 2D/3D switching type liquid crystal display unit performs 2D display, it remains to be the case that the light emitted from the light source passes through the three active areas, i.e. the switching liquid crystal layer, the parallax barrier, and the display liquid crystal layer. The only difference is that the switching liquid crystal layer disables the parallax barrier.

Thus, in the 2D/3D switching type liquid crystal display unit, both in performing the 3D display and in performing the 2D display, the light emitted from the light source passes through the switching liquid crystal layer and the parallax barrier. Accordingly, light utilization efficiency is lowered. Therefore, power of a light source used in the 2D/3D switching type liquid crystal display unit needs to be higher than that of a light source used in a liquid crystal display unit which performs only 2D display or 3D display.

If a light source having higher power is used, it is particularly likely that the temperature of the liquid crystal layer (the display liquid crystal layer or the switching liquid crystal layer) provided closer to the light source increases, often to such an extent as to be equal to or higher than an ambient temperature. Therefore, there is a possibility that the liquid crystal layer provided closer to the light source does not function normally, thereby adversely affecting display operation, even at an ambient temperature which guarantees normal functions of the display liquid crystal layer and the switching liquid crystal layer.

DISCLOSURE OF INVENTION

The present invention was made to solve the foregoing problem. An object of the present invention is to provide a production method for a patterning phase difference plate, the method being such that an alignment mark can be formed without increasing processing steps, even if the alignment mark is formed at such a position as to contact the liquid crystal layer.

To attain the foregoing object, a patterning phase difference plate of the present invention includes an alignment film provided on a substrate material, the alignment film having a first alignment region and a second alignment region, the first alignment region and the second alignment region having different alignment directions; a liquid crystal layer provided on the alignment film; and an alignment mark for use in bonding the patterning phase difference plate to another member, the alignment mark being a region having an optical function different from an optical function of a region surrounding the alignment mark.

According to this arrangement, the alignment mark has the optical function different from the optical function of the region surrounding the alignment mark. Specifically, the alignment film has different alignment directions in the region of the alignment mark and in the region surrounding the alignment mark. Therefore, after polarized light is received in the vicinity of the alignment mark and transmitted through the liquid crystal layer of the patterning phase difference plate, the polarized light is polarized differently through the region of the alignment mark and the region surrounding the alignment mark (that is, polarization axes are different by 90°). The light transmitted in the vicinity of the alignment mark of the patterning phase difference plate is detected after being transmitted through a polarizing plate that is so set as to have a transmission axis parallel to the polarization axis of the light transmitted through the region surrounding the alignment mark. At this time, the polarizing plate cuts off only the light radiated onto the region of the alignment mark. This makes it possible to detect the alignment mark.

Because the alignment mark is thus detected by utilizing optical characteristics of the alignment film and a liquid crystal layer, no layer for forming the alignment mark is provided. Therefore, unlike the case where the alignment film is formed by using resist, there is no such problem that the alignment mark is dissolved by a liquid crystal solution. As a result, the alignment mark of the patterning phase difference plate can be formed without increasing the processing steps.

It is preferable if the patterning phase difference plate is such that one of the first alignment region and the second alignment region is provided in the region of the alignment mark, and the other of the first alignment region and the second alignment region is provided in the region surrounding the alignment mark.

According to the patterning phase difference plate arranged in this manner, the alignment mark can be formed simultaneously when the first alignment region and the second alignment region are formed.

To attain the foregoing object, a production method of the present invention for a patterning phase difference plate including an alignment film provided on a substrate material, the alignment film having a first alignment region and a second alignment region, the first alignment region and the second alignment region having different alignment directions; a liquid crystal layer provided on the alignment film; and an alignment mark for use in bonding the patterning phase difference plate to another member, includes a first rubbing step, in which an entire surface of the alignment film provided on the substrate material is rubbed so that the alignment direction of the first alignment region is given to the entire surface of the alignment film; a mask forming step, in which a resist layer is formed on the alignment film so as to mask (i) the first alignment region and (ii) the region of the alignment mark or the region surrounding the alignment mark; a second rubbing step, in which the alignment film is rubbed through the mask so that the alignment direction of the second alignment region is given to the alignment film; a mask removing step, in which the resist layer, which has been formed as a mask, is removed; and a liquid crystal layer forming step, in which the liquid crystal layer is formed on the alignment film.

According to this arrangement, a plurality of regions having different alignment directions are formed on the alignment film by the first rubbing step, the mask forming step, the second rubbing step, and the mask removing step. Specifically, after the first rubbing step (in which the alignment direction of the first alignment region is given), a predetermined region is masked in the mask forming step, and the second rubbing step (in which the alignment direction of the second alignment region is given) is performed through the mask. As a result, a non-masked region has the alignment direction of the second alignment region, and a masked region maintains the alignment direction of the first alignment region, and.

In the mask forming step, not only the first alignment region, but also the region of the alignment mark or the region surrounding the alignment mark is masked. Therefore, the region of the alignment mark and the region surrounding the alignment mark have different alignment directions. In the liquid crystal layer forming step, the liquid crystal layer is formed on the alignment film. In this way, the optical characteristics of the patterning phase difference plate are attained without causing the problem that the formation of the alignment mark increases the processing steps.

The present invention was made to solve the foregoing problem. An object of the present invention is to provide a 2D/3D switching type liquid crystal display unit capable of performing display operation without fail at an ambient temperature that guarantees operation.

To attain the foregoing object, a 2D/3D switching type liquid crystal display panel of the present invention includes a display-use liquid crystal panel capable of performing 2D display and 3D display, the display-use liquid crystal panel generating a display image in accordance with image data inputted; a parallax barrier which attains a 3D effect by giving a certain viewing angle to the display image at a time of 3D display; and a switching liquid crystal panel which switches between 2D display and 3D display by enabling or disabling an effect of the parallax barrier, one of (a) the display-use liquid crystal panel and (b) the switching liquid crystal panel being provided closer to a light source than the other, a liquid crystal layer in said one of (a) the display-use liquid crystal panel and (b) the switching liquid crystal panel having a transition point higher than that of a liquid crystal layer in the other.

To attain the foregoing object, a 2D/3D switching type liquid crystal display unit of the present invention includes the 2D/3D switching type liquid crystal display panel arranged in the foregoing manner.

According to this arrangement, because the liquid crystal layer in the liquid crystal panel provided closer to the light source has the transition point higher than that of the liquid crystal layer in the liquid crystal panel provided farther from the light source, the operation of the 2D/3D switching type liquid crystal display unit is guaranteed up to an ambient temperature close to the transition point of the liquid crystal panel provided farther from the light source, even if the temperature of the liquid crystal panel provided closer to the light source is higher than the ambient temperature due to the influence of the heat received from the light source.

For a fuller understanding of the nature and advantages of the invention, reference should be made to the ensuing detailed description taken in conjunction with the accompanying drawings.

BEST MODE FOR CARRYING OUT THE INVENTION

The following more specifically describes the present invention through examples and comparative examples. However, the present invention is not limited by the examples and comparative examples.

With reference to FIGS. 1 through 8, one embodiment of the present invention is described below. First, a schematic arrangement of a 2D/3D switching type liquid crystal display panel using a patterning phase difference plate of the present embodiment is described with reference to FIG. 2.

Figure 1:
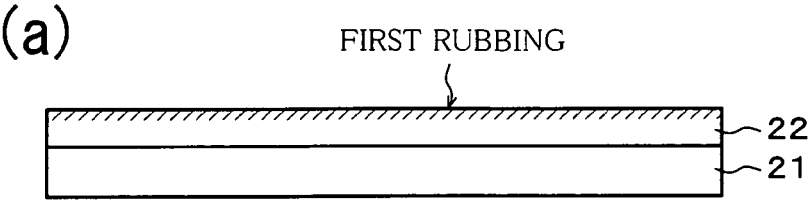
FIG. 1(a) is a cross-sectional view illustrating a patterning phase difference plate after the completion of first rubbing.
FIG. 1(b) is a cross-sectional view illustrating the patterning phase difference plate after the formation of a resist layer.
FIG. 1(c) is a cross-sectional view illustrating the patterning phase difference plate after the completion of first exposure, development, and drying.
FIG. 1(d) is a cross-sectional view illustrating the patterning phase difference plate after the completion of second rubbing.
FIG. 1(e) is a cross-sectional view illustrating the patterning phase difference plate after the completion of second exposure, development, and drying.
FIG. 1(f) is a cross-sectional view illustrating the patterning phase difference plate after the formation of a liquid crystal layer.
Figure 1:
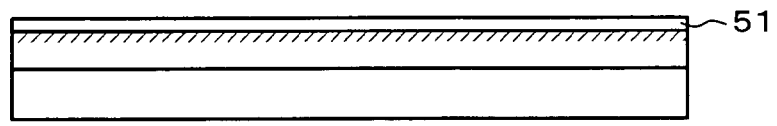
Figure 1:
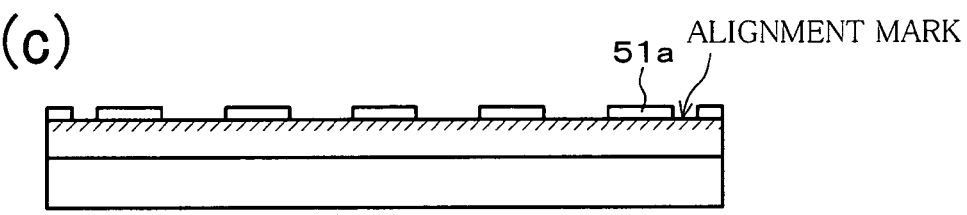
Figure 1:
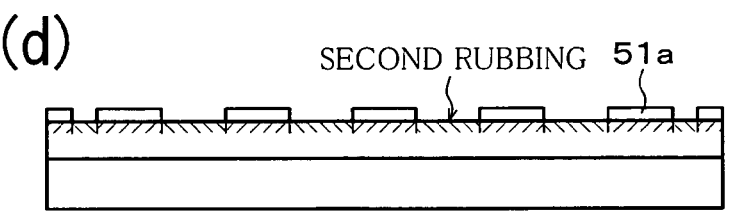
Figure 1:
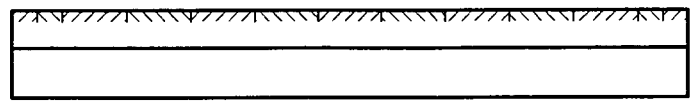
Figure 1:
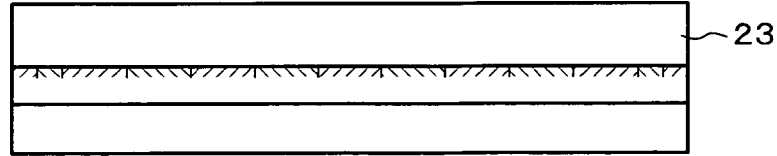
Figure 2:
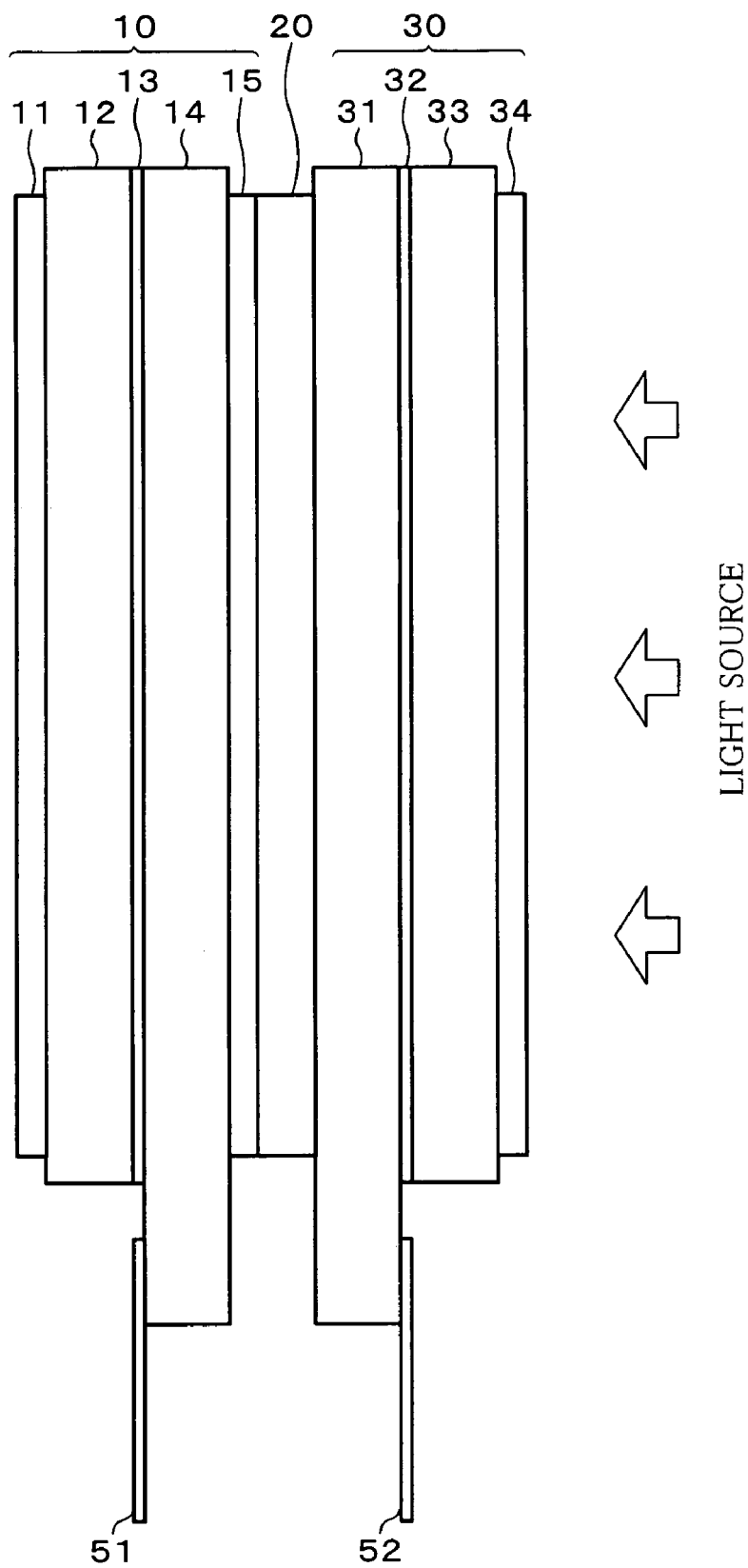
FIG. 2 is a cross-sectional view illustrating a schematic arrangement of a 2D/3D switching type liquid crystal display panel using the patterning phase difference plate.

As shown in FIG. 2, the 2D/3D switching type liquid crystal display panel includes a display-use liquid crystal panel 10, a patterning phase difference plate 20, and a switching liquid crystal panel 30, which are bonded together.

The display-use liquid crystal panel 10 is a TFT liquid crystal display panel, and includes a first polarizing plate 11, an opposed substrate 12, a liquid crystal layer 13, an active-matrix substrate 14, and a second polarizing plate 15, which are laminated. Through a wire 51 such as FPC (Flexible Printed Circuits), the active matrix substrate 14 receives image data corresponding to an image to be displayed.

Thus, the display-use liquid crystal panel 10 is provided so that the 2D/3D switching type liquid crystal display panel can generate a display screen corresponding to the image data. In other words, the display-use liquid crystal panel 10 is provided to the 2D/3D switching type liquid crystal display panel as display image generating means for generating a display screen corresponding to the image data. As long as the display-use liquid crystal panel 10 has a function of generating a display screen, a display method (a TN method or an STN method) and a driving method (active matrix driving or passive matrix driving) of the display-use liquid crystal panel 10 are not particularly limited.

Figure 3A:
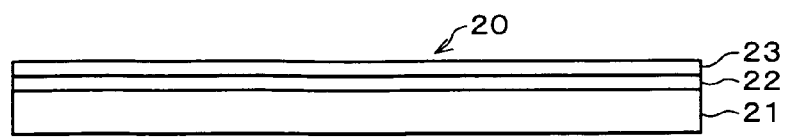
FIG. 3(a) is a cross-sectional view of the patterning phase difference plate.
Figure 3B:
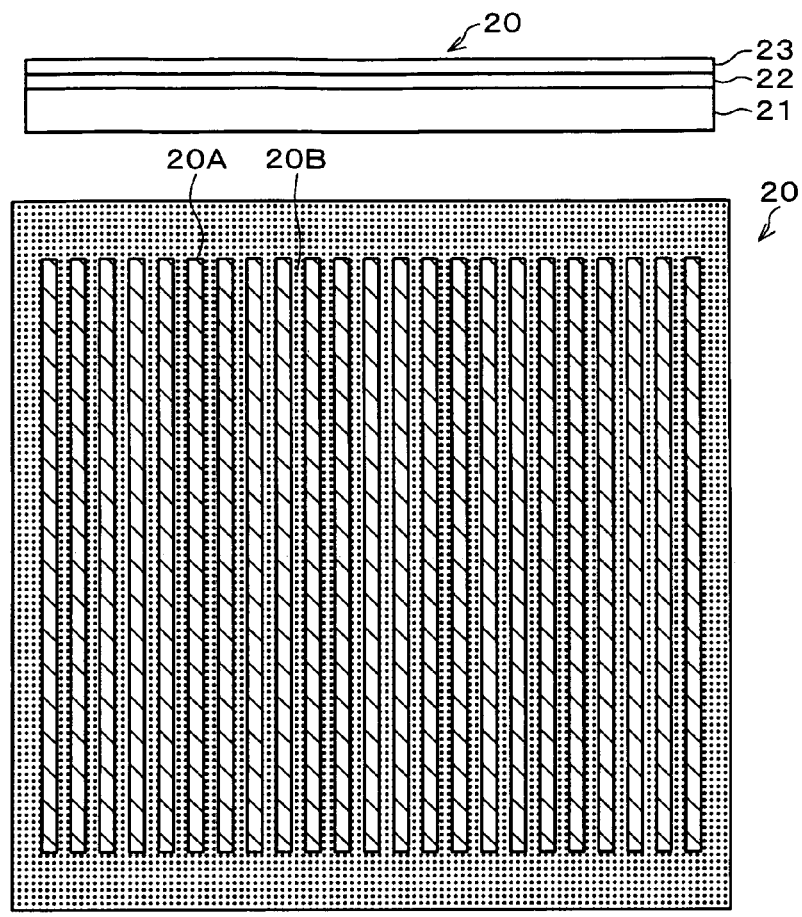
FIG. 3(b) is a plan view of the patterning phase difference plate.
Figure 3C:
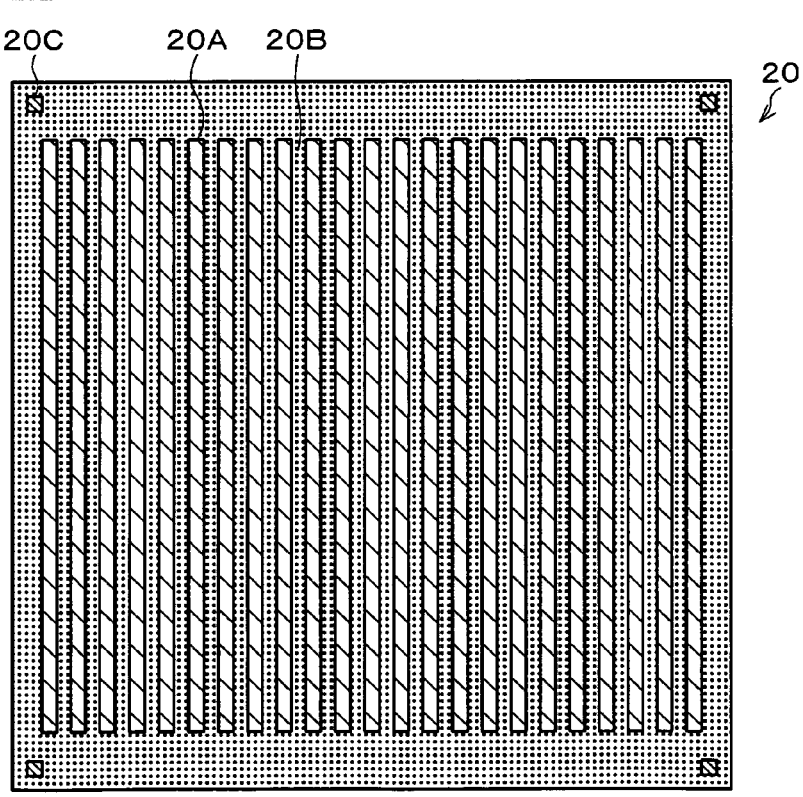
FIG. 3(c) is a plan view of the patterning phase difference plate after the formation of an alignment mark.

The patterning phase difference plate 20 functions as a part of a parallax barrier. As shown in FIG. 3(a), the patterning phase difference plate 20 includes a transparent substrate 21, an alignment film 22, and a liquid crystal layer 23. The alignment film 22 is provided on the transparent substrate 21, and the liquid crystal layer 23 is provided on the alignment film 22. In an active area of the patterning phase difference plate 20, as shown in FIG. 3(b), a first region 20A (shaded region in the figure) and a second region 20B (dotted region in the figure) are arranged alternately in a tripe shape. The first region 20A and the second region 20B have different polarization states. In addition, as shown in FIG. 3(c), the patterning phase difference plate 20 is provided with an alignment mark 20C formed by a production method described later.

The switching liquid crystal panel 30 includes a driver-side substrate 31, a liquid crystal layer 32, an opposed substrate 33, and a third polarizing plate 34, which are laminated. The driver-side substrate 31 is connected to a wire 52. Through the wire 52, a driving voltage is applied to the driver-side substrate 31 when the liquid crystal layer 32 is ON.

The switching liquid crystal panel 30 is provided as switching means for switching a polarization state of light (light transmitted through the switching liquid crystal panel 30) in accordance with ON/OFF of the liquid crystal layer 32. Specifically, the switching liquid crystal panel 30 optically modulates the light (light transmitted through the switching liquid crystal panel 30) differently in performing 2D display and in performing 3D display. Unlike the display-use liquid crystal panel 10, the switching liquid crystal panel 30 does not have to be driven by matrix driving. Driving electrodes of the driver-side substrate 31 and of the opposed substrate 33 are formed on an entire surface of an active area of the switching liquid crystal panel 30.

Described next is display operation of the 2D/3D switching type liquid crystal display panel arranged in the foregoing manner.

Figure 4:
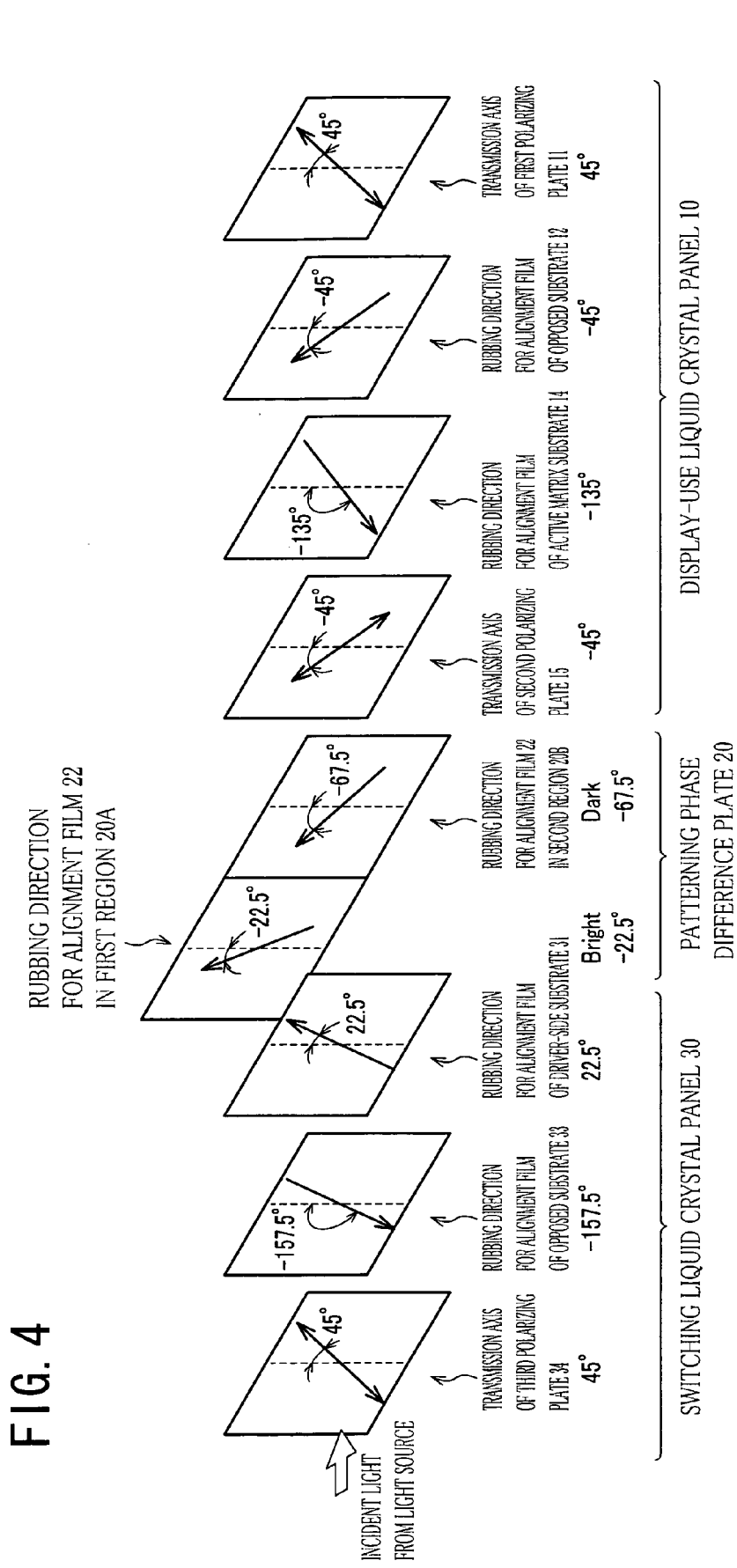
FIG. 4 is a diagram illustrating an optical axis direction at each member of the 2D/3D switching type liquid crystal display panel.

To begin with, FIG. 4 illustrates an optical axis direction of each member of the 2D/3D switching type liquid crystal display panel shown in FIG. 2. The optical axis shown in FIG. 4 is directed in a direction of a slow phase axis of the alignment film (i.e. a rubbing direction for the alignment film) in the case of the liquid crystal panels and phase difference plates, and in a direction of a transmission axis in the case of the polarizing plates.

In the arrangement of FIG. 4, incident light emitted from a light source is firstly polarized by the third polarizing plate 34 of the switching liquid crystal panel 30. When 3D display is performed, the switching liquid crystal display panel 30 is OFF, and functions as a half wavelength plate.

The light transmitted through the switching liquid crystal panel 30 is then incident on the patterning phase difference plate 20. In the first region 20A and the second region 20B of the patterning phase difference plate 20, rubbing directions (i.e. directions of slow axes) are different. Therefore, light transmitted through the first region 20A and light transmitted through the second region 20B are polarized differently. In FIG. 4, the polarization axis of the light transmitted through the first region 20A and the polarization axis of the light transmitted through the second region 20B are different by 90°. Through birefringence ratio anisotropy and thickness of the liquid crystal layer 23, the patterning phase difference plate 20 is set to function as a half wavelength plate.

The light transmitted through the patterning phase difference plate 20 is incident on the second polarizing plate 15 of the display-use liquid crystal panel 10. When 3D display is performed, the polarization axis of the light transmitted through the first region 20A of the patterning phase difference plate 20 is parallel to the transmission axis of the second polarizing plate 15. Therefore, the light transmitted through the first region 20A is transmitted through the polarizing plate 15. On the other hand, the polarization axis of the light transmitted through the second region 20B forms an angle of 90° with the transmission axis of the second polarizing plate 15. Therefore, the light transmitted through the second region 20B is not transmitted through the polarizing plate 15.

According to the arrangement in FIG. 4, the function of parallax barrier (parallax barrier means) is attained by associated optical functions of the patterning phase difference plate 20 and the second polarizing plate (parallax barrier-use polarizing plate) 15. According to this arrangement, the first region 20A of the patterning phase difference plate 20 functions as a transmission region, and the second region 20B of the patterning phase difference plate 20 functions as a cutoff region.

The light transmitted through the second polarizing plate 15 is optically modulated differently by a black-display pixel and a white-display pixel in the liquid crystal layer 13 of the display-use liquid crystal panel 10. Only the light optically modulated by the white-display pixel is transmitted through the first polarizing plate 11, thereby displaying an image.

At this time, the light angled at a certain viewing angle by being transmitted through the transmission region of the parallax barrier is transmitted through pixels in the display-use liquid crystal panel 10, the pixels respectively corresponding to an image for the right eye and an image for a left eye. As a result, the image for the right eye and the image for the left eye are separated at different viewing angles, so as to perform 3D display.

In order to perform 2D display, the switching liquid crystal panel 30 is turned ON, so that the light transmitted through the switching liquid crystal panel 30 will not be optically modulated. The light transmitted through the switching liquid crystal panel 30 is then transmitted through the patterning phase difference plate 20. The light transmitted through the first region 20A and the light transmitted through the second region 20B are polarized differently.

However, unlike in the case of 3D display, the switching liquid crystal display panel 30 does not perform the function of optically modulating the light in the case of 2D display. Therefore, the polarization axes of light beams transmitted through the patterning phase difference plate 20 are angled symmetrically with respect to the transmission axis of the second polarizing plate 15. As a result, the light transmitted through the first region 20A of the patterning phase difference plate 20 and the light transmitted through the second region 20B of the patterning phase difference plate 20 are transmitted through the second polarizing plate 15 at the same transmittance. Thus, the function of parallax barrier by the associated optical functions of the patterning phase difference plate 20 and the second polarizing plate 15 is not attained (that is, the certain viewing angle is not given), resulting in 2D display.

Next, assembly process for the 2D/3D switching type liquid crystal display panel is described with reference to FIG. 5.

The 2D/3D switching type liquid crystal display panel of the present embodiment is made by bonding the display-use liquid crystal panel 10, the patterning phase difference plate 20, and the switching liquid crystal panel 30, which are produced separately.

Figure 5:
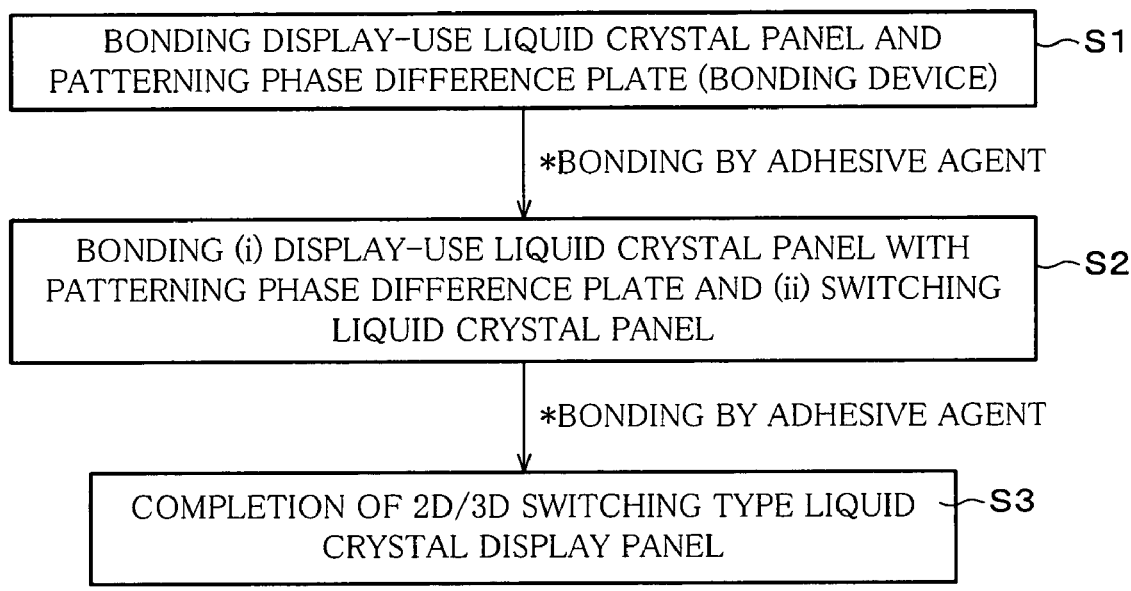
FIG. 5 is a flowchart showing assembly process for the 2D/3D switching type liquid crystal display panel.

As shown in FIG. 5, in the assembly process for the 2D/3D switching type liquid crystal display panel, the patterning phase difference plate 20 is bonded to the display-use liquid crystal panel 10 by using an adhesive agent (S1).

Then, the switching liquid crystal display panel 30 is bonded to the display-use liquid crystal display panel 10, which is bonded with the patterning phase difference plate 20, and the 2D/3D switching type liquid crystal display panel is completed (S2 and S3).

In these bonding steps, alignment is performed by using an alignment mark provided to each of the display-use liquid crystal panel 10, the patterning phase difference plate 20, and the switching liquid crystal panel 30. Therefore, the alignment mark is formed in each process of producing the display-use liquid crystal panel 10, the patterning phase difference plate 20, and the switching liquid crystal panel 30.

A feature of the present invention is, in particular, the method of forming the alignment mark in the process of producing the patterning phase difference plate 20. The process of producing the patterning phase difference plate 20 is described below with reference to FIG. 6 and FIG. 1.

Figure 6:
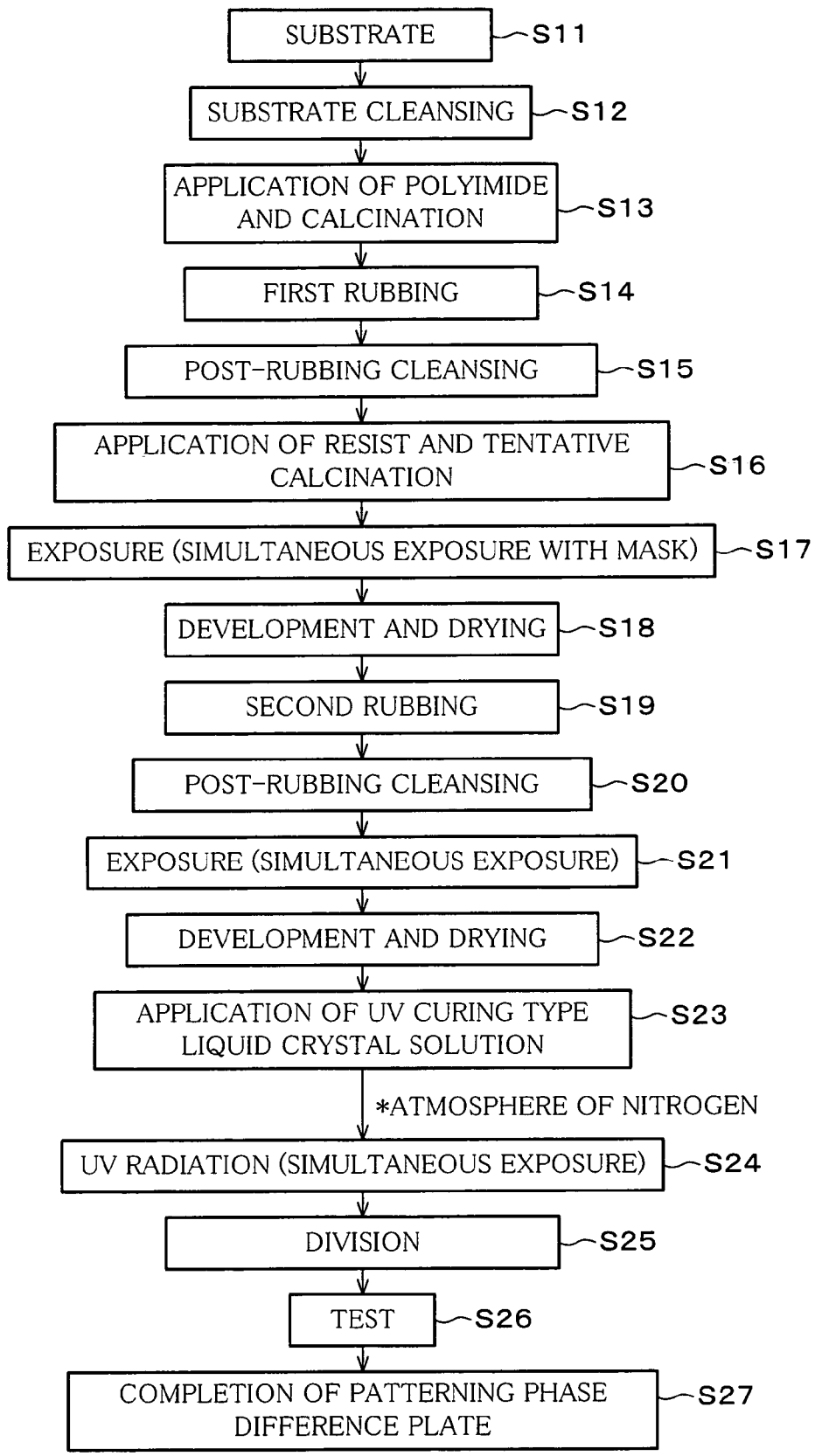
FIG. 6 is a flowchart showing production process for the patterning phase difference plate.

In the process of producing the patterning phase difference plate 20, as shown in FIG. 6, raw glass to be used as the substrate (substrate material) 21 is cleansed, and polyimide is applied on one side of the cleansed substrate, and the substrate is then calcined, so as to form the alignment film 22 (S11 to S13). Next, the alignment film 22 is subjected to first rubbing treatment (first rubbing; S14). The rubbing direction in the first rubbing is the rubbing direction for the second region 20B. FIG. 1(a) illustrates the state of the phase difference plate 20 after the completion of S11 to S14.

After the first rubbing, resist is applied onto the alignment film 22 of the cleansed substrate, and tentative calcination is performed, as to as form a resist layer 51 (S15 and S16). FIG. 1(b) illustrates the state of the phase difference plate 20 after the completion of S15 and S16.

After the resist layer 51 is formed, the resist layer 51 is patterned through the steps of exposing, developing, and drying (S17 and S18). The patterned resist layer 51 forms a mask part 51a for masking a spot that is to be the second region 20B of the patterning phase difference plate 20. At those spots that are to be the first region 20a and the alignment mark 20C of the patterning phase difference plate 20, the alignment layer 22 is exposed, because those spots are not covered with the mask. FIG. 1(c) illustrates the state of the patterning phase difference plate 20 after the completion of S17 to S18.

After the resist layer 51 is patterned, the substrate is subjected to second rubbing treatment (second rubbing) performed from the side of the resist layer 51 (S19). The rubbing direction in the second rubbing is the rubbing direction for the first layer 20A. At this time, in the second region 20B, where the alignment film 22 is covered with the mask part 51a, the direction of the slow phase axis formed by the first rubbing is maintained. On the other hand, in the first region 20A and the alignment mark 20C, where the alignment film 22 is exposed (not covered by the mask part 51a), the slow phase axis is parallel to the rubbing direction of the second rubbing. FIG. 1(d) illustrates the state of the patterning phase difference plate 20 after the completion of S19.

After the second rubbing, the resist remaining on the alignment film 22 of the cleansed substrate is exposed and developed again, so as to remove the mask part 51a, and the patterning phase difference plate 20 is then dried (S20 to S22). FIG. 1(e) illustrates the state of the patterning phase difference plate 20 after the completion of S20 to S22.

After the mask part 51a is removed, a UV curing type liquid crystal solution is applied onto the alignment film 22 on the substrate by spin coating or the like method, and ultraviolet rays are radiated onto the UV curing type liquid crystal solution so as to bridge and polymerize liquid crystal molecules (S23 and S24). As a result, the liquid crystal layer 23 is formed. FIG. 1(f) illustrates the state of the patterning phase difference plate 20 after the completion of S24.

S11 to S24 are performed in such a manner that a plurality of patterning phase difference plates 20 are formed on a single large-scale substrate at the same time. Therefore, production of the patterning phase difference plate 20 is completed after dividing the substrate provided with the plurality of patterning phase difference plates 20 into individual patterning phase difference plates 20, and testing the individual patterning phase difference plates 20 (S25 to S27).

As described above, in the production method of the present embodiment for the patterning phase difference plate 20, two regions having different alignment directions are formed on the alignment film 22 by forming a mask made of resist after the first rubbing, and performing the second rubbing through the mask. No mask is provided in the region where the alignment mark 20C is to be formed. Therefore, in the patterning phase difference plate 20, the alignment direction in the region of the alignment mask 20C is the same as the alignment direction in the first region 20A. In the region surrounding the alignment mark 20C, the alignment direction is the same as the alignment direction in the second region 20B.

Because the liquid crystal layer 23 is formed on the alignment film 22 of the patterning phase difference plate 20, the light transmitted through the region of the alignment mark 20C and the light transmitted through the region surrounding the alignment mark 20C are polarized differently. They are identical, however, in terms of light amount. Therefore, the alignment mark 20C cannot be detected by an ordinary method. However, the alignment mark 20C can be detected if the ordinary method is combined with a polarizing plate in an alignment mark detection unit.

Figure 7:
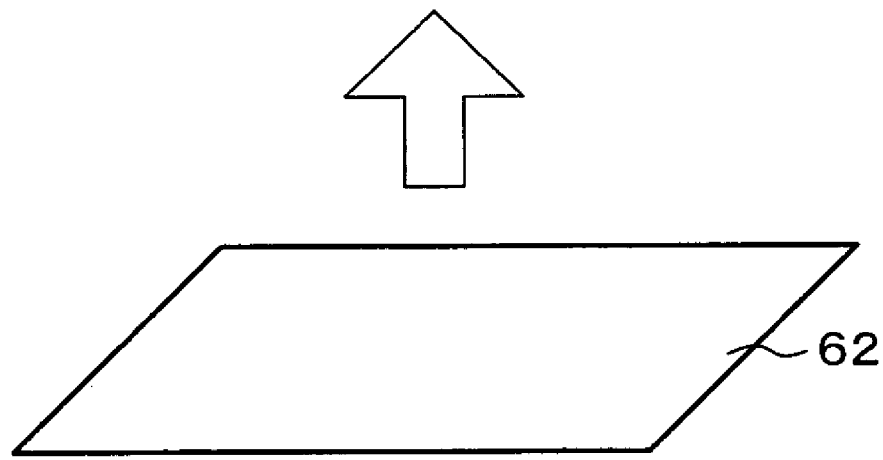
FIG. 7 is a perspective view illustrating a schematic arrangement of an alignment mark detection unit for detecting the alignment mark of the patterning phase difference plate.
Figure 7:
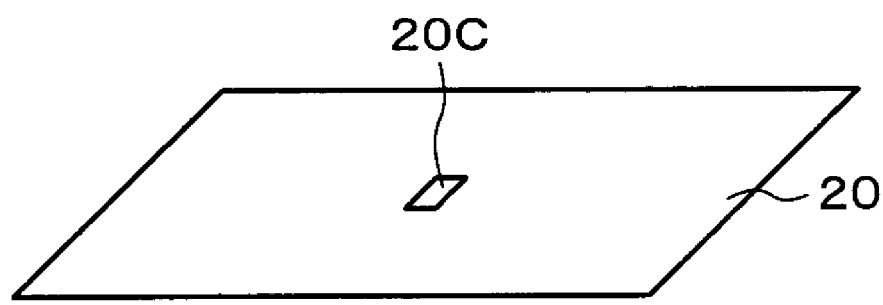
Figure 7:
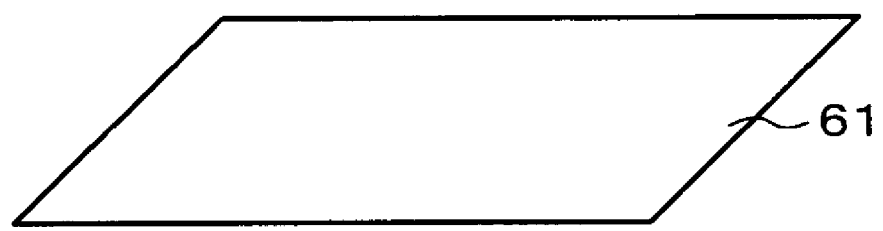
Figure 7:
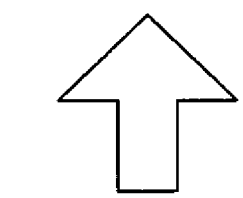
Figure 8:
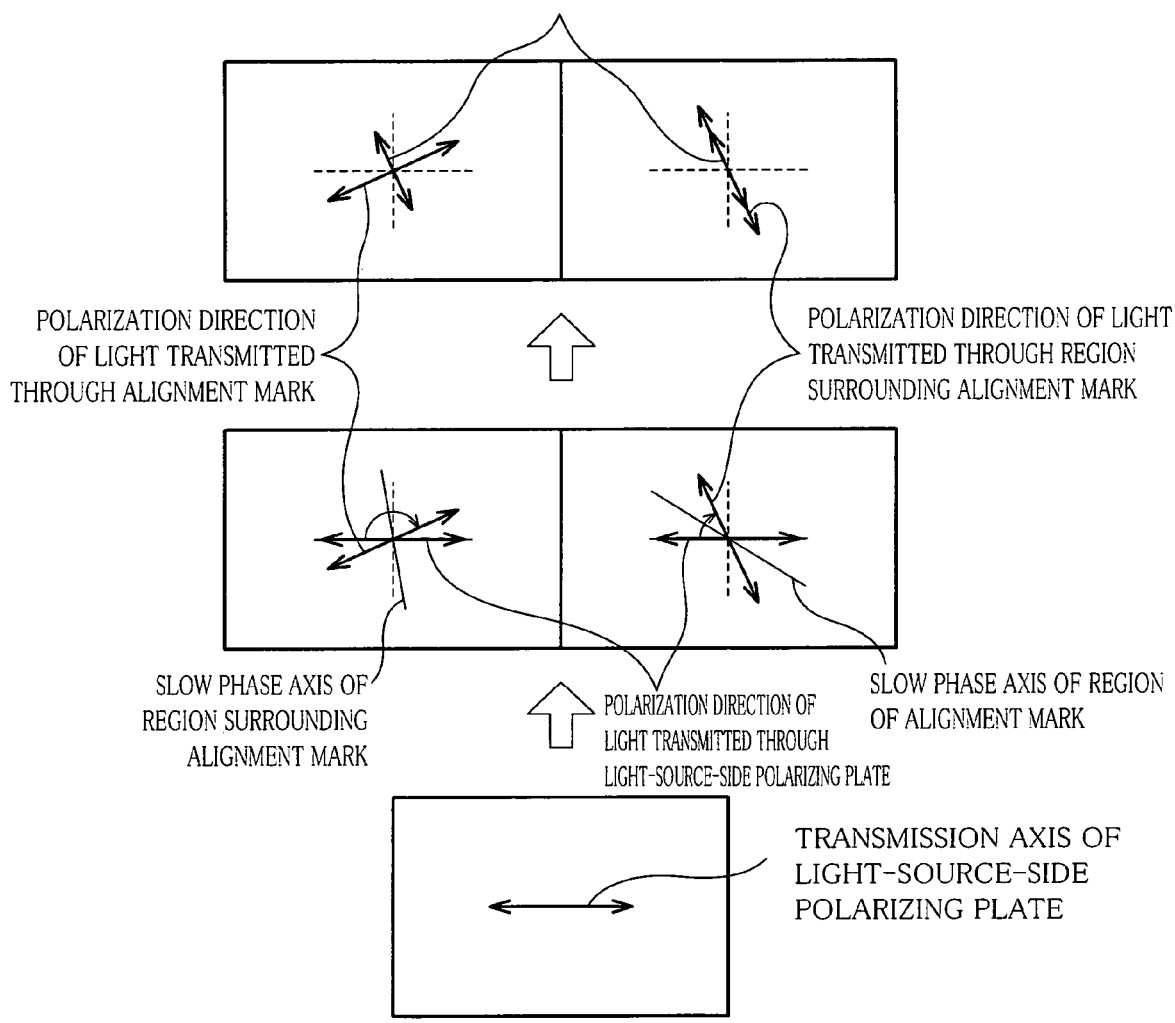
FIG. 8 is a diagram illustrating a method of detecting the alignment mark of the patterning phase difference plate.
Figure 9A:
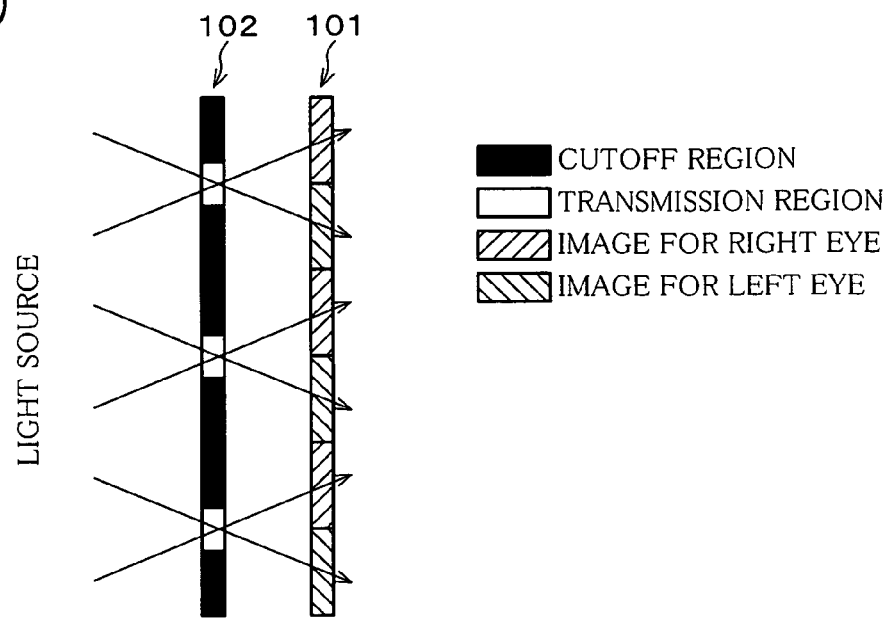
FIG. 9(a) is a diagram illustrating a mechanism of 3D display through the illustration of an effect of giving a viewing angle by a parallax barrier.
Figure 9B:
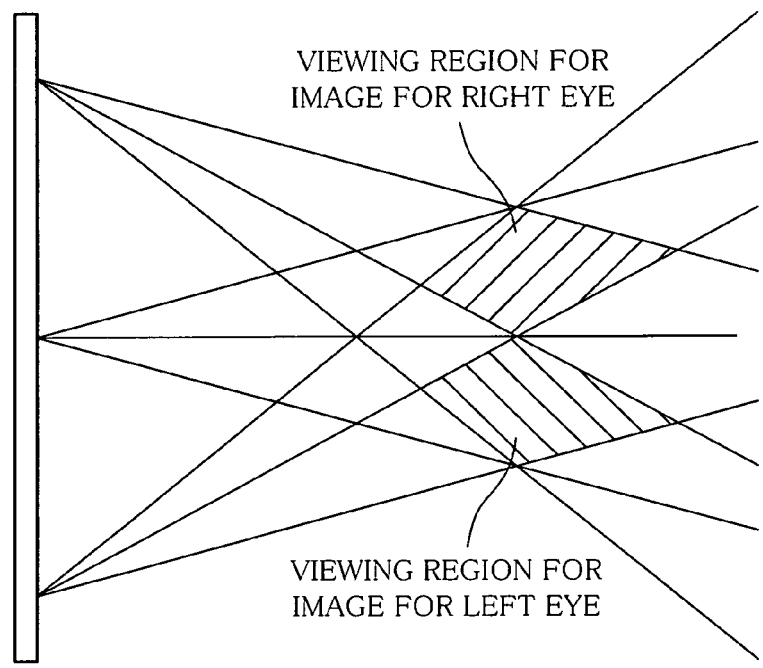
FIG. 9(b) is a diagram illustrating the mechanism of 3D display through the illustration of viewing regions for a 3D display screen.

With reference to FIGS. 7 and 8, the following describes a method of detecting the alignment mark 20C by using the alignment mark detection unit. The alignment mark detection unit is used as an alignment mechanism in a bonding device for bonding the patterning phase difference plate 20 with another member (e.g. the display-use liquid crystal panel 10).

In the alignment mark detection unit, as shown in FIG. 7, light emitted from a light source is transmitted through a light-source-side polarizing plate 61, and radiated onto the alignment mark 20C of the patterning phase difference plate 20. The light transmitted through the patterning phase difference plate 20 is transmitted through a light-receiving-section-side polarizing plate 62, and detected by a light-receiving section. Although not shown in FIG. 7, the alignment mark of the aforesaid another member (the member to be aligned with the patterning phase difference plate 20) is also positioned between the light source and the light-receiving section. By detecting an overlapping state of the alignment marks, the patterning phase difference plate 20 and the aforesaid another member are aligned.

As shown in FIG. 8, the light transmitted through the light-source-side polarizing plate 61 (polarized light that is parallel to the transmission axis direction of the light-source-side polarizing plate 61) is incident on the patterning phase difference plate 20. There is a difference of 45° between the slow phase axis direction in the region of the alignment mark 20C and the slow phase axis direction in the region surrounding the alignment mark 20C. Therefore, there is a difference of 90° between the polarization axis of the light transmitted through the region of the alignment mark 20C and the polarization axis of the light transmitted through the region surrounding the alignment mark 20C.

The transmission axis direction of the light-receiving-section-side polarizing plate 62 is so set as to be parallel to the polarization axis of the light transmitted through the region surrounding the alignment mark 20C. According to this arrangement, only the light radiated into the region of the alignment mark 20C is cut off from the light to be received by the light-receiving section. Thus, the alignment mark 20C can be detected.

As described above, the patterning phase difference plate 20 of the present embodiment is such that the alignment mark 20C is detected by utilizing the optical characteristic of the alignment film 22 and the liquid crystal layer 23. There is no layer that is provided for forming the alignment mark. Therefore, unlike the case where the alignment mark is formed by using resist, there is no such problem that the alignment mark dissolves in a liquid crystal solution. As a result, the alignment mark of the patterning phase difference plate can be formed without increasing the processing steps.

In the alignment mark detection unit, two polarizing plates need to be used in order to detect the alignment mark 20C of the patterning phase difference plate 20. However, the provision of the polarizing plates hardly increases the cost for the alignment mark detection unit.

In the foregoing explanation, the alignment direction of the alignment mark is identical to that of the second alignment region (in FIG. 3, the first region 20A), which is formed by the second rubbing. However, the alignment direction of the alignment mark may be identical to that of the first alignment region (in FIG. 3, the second region 20B), which is formed by the first rubbing. In this case, the alignment mark is masked at the time of the first rubbing, while the region surrounding the alignment mark is exposed.

In the foregoing explanation, the present invention is described as a method of forming the alignment mark of the patterning phase difference plate. However, the present invention is applicable in other ways. The patterning phase difference plate is obtained by simultaneously forming a plurality of patterning phase difference plates on a large-scale substrate, and cutting each patterning phase difference plate off the large-scale substrate. In order to cut off the patterning phase difference plate, a marker (mark for cutting) is required, and the present invention is applicable to the formation of the marker.

By providing a driving circuit, a backlight (light source), and the like to the 2D/3D switching type liquid crystal display panel of the present embodiment, a 2D/3D switching type liquid crystal display unit is provided.

In the 2D/3D switching type liquid crystal display unit, the light emitted from the light source is transmitted through the three active areas, i.e. the display-use liquid crystal panel 10, the patterning phase difference plate 20, and the switching liquid crystal panel 30, both at the time of 3D display and at the time of 2D display. Due to cutoff and absorption in each active area, light utilization efficiency decreases. In light of the drawback that the light utilization efficiency is low, a high-power light source is used in the 2D/3D switching type liquid crystal display unit, so as to attain bright display screen.

Thus, a high-power light source needs to be used in the 2D/3D switching type liquid crystal display unit. Therefore, a CCFT (Cold Cathode Fluorescent Tube) or the like is more suitable as the light source than an LED (Light Emitting Diode). However, because such a high-power light source generates a large amount of heat, the temperature of members provided close to the light source easily increases in the 2D/3D switching type liquid crystal display unit.

In the 2D/3D switching type liquid crystal display panel arranged as shown in FIG. 2, a transition point $Tni1$ of the display-use liquid crystal panel 10 and a transition point $Tni2$ of the switching liquid crystal panel 30 need to be equal to or higher than $T1$, which is a temperature that guarantees operation of the display-use liquid crystal panel 10 and of the switching liquid crystal 30.

In reality, however, even if the transition point $Tni1$ of the display-use liquid crystal panel 10 and the transition point $Tni2$ of the switching liquid crystal panel 30 are set to be equal to or higher than $T1$, an operating temperature of especially the liquid crystal panel provided closer to the light source (in FIG. 2, the switching liquid crystal panel 30) becomes equal to or higher than an ambient temperature, due to the influence of heat received from the light source. Therefore, even if the ambient temperature is equal to or lower than $T1$, there is a possibility that the temperature of the switching liquid crystal panel 30 exceeds the transition point thereof, thereby hindering normal display operation of the 2D/3D switching type liquid crystal display unit.

To avoid this problem, the 2D/3D switching type liquid crystal display unit of the present embodiment is designed so that the transition point of one of the two kinds of display panels (the display-use liquid crystal panel and the switching liquid crystal panel) is higher than the transition point of the other of the two kinds of display panels, the one of the two kinds of display panels being the display panel provided closer to the light source. In FIG. 2, the transition point $Tni1$ of the liquid crystal layer of the display-use liquid crystal panel 10 and the transition point $Tni2$ of the liquid crystal layer of the switching liquid crystal layer 30 are set so as to satisfy $Tni1<Tni2$. It is preferable that the difference between $Tni1$ and $Tni2$ is 10° C. or more.

If the liquid crystal layer of the liquid crystal panel provided closer to the light source has a transition point higher than that of the liquid crystal layer of the liquid crystal panel provided farther from the light source, the operation of the 2D/3D switching type liquid crystal display unit is guaranteed up to an ambient temperature close to the transition point of the liquid crystal panel provided farther from the light source, even if the temperature of the liquid crystal panel provided closer to the light source is higher than the ambient temperature due to the influence of the heat received from the light source.

In the arrangement of FIG. 2, the switching liquid crystal panel 30 is the liquid crystal panel provided closer to the light source. However, in the 2D/3D switching type liquid crystal display panel of the present invention, the display-use liquid crystal panel 10 may be the liquid crystal panel provided closer to the light source. In this case, the display-use liquid crystal panel 10, the switching liquid crystal panel 30, and the patterning phase difference plate 20 are provided in this order from the side closer to the light source, and the relationship between the transition point $Tni1$ of the liquid crystal layer of the display-use liquid crystal panel 10 and the transition point $Tni2$ of the liquid crystal layer of the switching liquid crystal panel 30 is $Tni1>Tni2$.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

According to the arrangement or method of the present invention, the alignment mark can be formed without increasing processing steps at such a position as to contact the liquid crystal layer. Therefore, the present invention can be suitably applied to a patterning phase difference plate (for use in a 2D/3D switching type liquid crystal display panel and the like) having an alignment mark, and to a production method for the patterning phase difference plate.

According to the arrangement of the present invention, display operation can be performed without fail at an ambient temperature that guarantees operation. Therefore, the present invention is suitably applied to a 2D/3D switching type liquid crystal display panel that allows for switching between 2D display and 3D display, and to a liquid crystal display unit.

The invention claimed is:

1. A 2D/3D switching type liquid crystal display panel, comprising:
  a display-use liquid crystal panel capable of performing 2D display and 3D display, the display-use liquid crystal panel generating a display image in accordance with image data inputted;
  a parallax barrier which attains a 3D effect by giving a certain viewing angle to the display image at a time of 3D display; and
  a switching liquid crystal panel which switches between 2D display and 3D display by enabling or disabling an effect of the parallax barrier,
  one of (a) the display-use liquid crystal panel and (b) the switching liquid crystal panel being provided closer to a light source than the other, a liquid crystal layer in said one of (a) the display-use liquid crystal panel and (b) the switching liquid crystal panel having a transition point higher than that of a liquid crystal layer in the other, wherein
  the switching liquid crystal panel, the parallax barrier and the display-use liquid crystal panel are positioned in this order from a light source emitting light that is incident onto the switching liquid crystal panel.

2. A 2D/3D switching type liquid crystal display unit, comprising:
  a 2D/3D switching type liquid crystal display panel including
    a display-use liquid crystal panel capable of performing 2D display and 3D display, the display-use liquid crystal panel generating a display image in accordance with image data inputted;
    a parallax barrier which attains a 3D effect by giving a certain viewing angle to the display image at a time of 3D display; and
    a switching liquid crystal panel which switches between 2D display and 3D display by enabling or disabling an effect of the parallax barrier,
  one of (a) the display-use liquid crystal panel and (b) the switching liquid crystal panel being provided closer to a light source than the other, a liquid crystal layer in said one of (a) the display-use liquid crystal panel and (b) the switching liquid crystal panel having a transition point higher than that of a liquid crystal layer in the other, wherein
  the switching liquid crystal panel, the parallax barrier and the display-use liquid crystal panel are positioned in this order from a light source emitting light that is incident onto the switching liquid crystal panel.

3. A liquid crystal display panel, comprising:
  a display-use liquid crystal panel which generates two display images in accordance with image data inputted;
  parallax barrier means which separates the two display images into different viewing angles; and
  a switching liquid crystal panel which enables or disables an effect of the parallax barrier means,
  one of (a) the display-use liquid crystal panel and (b) the switching liquid crystal panel being provided closer to a light source than the other, a liquid crystal layer in said one of (a) the display-use liquid crystal panel and (b) the switching liquid crystal panel having a transition point higher than that of a liquid crystal layer in the other, wherein
  the switching liquid crystal panel, the parallax barrier and the display-use liquid crystal panel are positioned in this order from a light source emitting light that is incident onto the switching liquid crystal panel.

4. A liquid crystal display device, comprising:
  a liquid crystal display panel including
    a display-use liquid crystal panel which generates two display images in accordance with image data inputted;
    parallax barrier means which separates the two display images into different viewing angles; and
    a switching liquid crystal panel which enables or disables an effect of the parallax barrier means,
  one of (a) the display-use liquid crystal panel and (b) the switching liquid crystal panel being provided closer to a light source than the other, a liquid crystal layer in said one of (a) the display-use liquid crystal panel and (b) the switching liquid crystal panel having a transition point higher than that of a liquid crystal layer in the other, wherein
  the switching liquid crystal panel, the parallax barrier and the display-use liquid crystal panel are positioned in this order from a light source emitting light that is incident onto the switching liquid crystal panel.

* * * * *